Oct. 23, 1956 M. W. GREEN 2,768,372
RANDOMLY PULSED RADIO RANGING SYSTEM
Filed Dec. 30, 1952
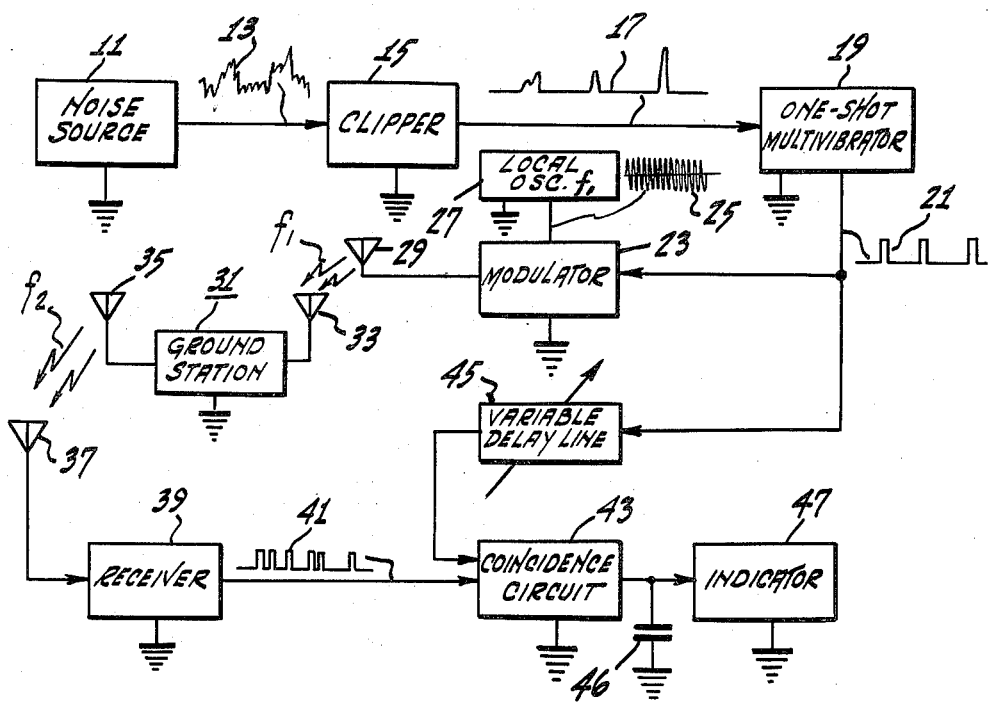
INVENTOR.
MILTON W. GREEN
BY
ATTORNEY

United States Patent Office 2,768,372
Patented Oct. 23, 1956

2,768,372

RANDOMLY PULSED RADIO RANGING SYSTEM

Milton W. Green, Princeton, N. J., assignor to Radio Corporation of America, a corporation of Delaware Application December 30, 1952, Serial No. 328,734

The terminal 15 years of the term of the patent to be granted has been disclaimed 5 Claims. (Cl. 343—12)

This invention relates generally to radio navigation. Particularly, the invention relates to a randomly pulsed radio ranging system which is useful in connection with omnirange aircraft navigation.

One presently known airborne ranging system utilized in conjunction with omnirange navigation operates essentially as follows. An aircraft which desires to measure the distance between its position and that of a reference point (for example, the omni-station) transmits a coded group of pulses on an assigned one of a number of ultra-high-frequency (U. H. F.) signalling channels. At the ground installation these coded pulses are received, decoded, recoded in a different manner, and the recoded signals transmitted throughout the area serviced by the ground station. At the aircraft the recoded signals are received and are separated from ground station transmissions intended for other aircraft serviced by the ground installation. The elapsed interval of time between the initial transmission of the craft of a coded pulse group and its reception of a modified pulse group transmitted by the ground station is a measure of the distance therebetween.

Systems of this general type are characterized by several undesirable features. Relatively elaborate coding and decoding circuitry is required aboard the aircraft. Specific code and frequency allocations must be made for each craft serviced with data by the ground station. Ground station receiving and transmitting equipment is excessively complicated since decoding and recoding operations must be performed at that location. Also, the system is not fail-safe in the sense that the failure of one aircraft to transmit the proper code signal group may interfere with the operation of another craft's equipment.

An object of the instant invention is to provide an improved radio ranging system for use in radio navigation.

Another object of the invention is to provide a randomly pulsed radio ranging system for use in radio navigation.

Another object of the invention is to provide a simplified radio ranging system useful in connection with omnirange navigation.

A further object of the invention is to conserve frequency spectra in systems of the above type.

A further object of the invention is to provide an airborne radio ranging system for use in omnirange navigation in which signal intelligence transmitted by one craft substantially does not interfere with intelligence transmitted by other craft within the omnirange service area.

A still further object of the invention is to provide a radio ranging system for use in omnirange navigation which is compatible with ranging systems enjoying similar use and performing similar functions.

The invention will be described in detail with reference to the accompanying drawing in which the single figure is a schematic circuit diagram, in block form, of a randomly pulsed radio ranging system in accordance with the invention.

Referring to the drawing, the airborne equipment of a given craft includes a photomultiplier or other source 11 of non-coherent wide band signals. These sources commonly are called "noise" signal sources and produce signals which are random in amplitude, frequency, and phase. The wide band signals 13 are applied to a high level clipper circuit 15 wherein only signals having amplitudes exceeding a predetermined threshold level may pass. The clipper circuit 15 delivers an output wave train 17 comprising a few pulses per second which are random in time. These thresholded pulses then are coupled to a monostable or "one-shot" multivibrator 19. The multivibrator produces constant amplitude and constant duration output signals 21 in response to the input wave train 19. The duration of these pulses is chosen to be short compared to the average pulse repetition rate. The multivibrator signals 21 simultaneously are coupled to two different circuits.

In the one instance the signals 21 are applied to a modulator unit 23. Also applied to the modulator 23 are radio-frequency signals 25 at the frequency $f_1$ which are generated by a local oscillator 27. Normally the modulator 23 is cut off. However, the multivibrator signals 21 key the modulator gating it on so that oscillator signal energy 25 is coupled therethrough to an omnidirectional antenna 29 which radiates the radio-frequency energy into space.

At the ground station 31 the signals radiated by the above airborne equipment and signals radiated by other craft within the service area of the station 31 and utilizing a common signalling channel are received at a receiving antenna 33. The ground station equipment includes a radio beacon which, in response to received aircraft signals, reproduces all the received signals and transmits them throughout the station service area at a carrier signal frequency $f_2$. The ground station transmitting antenna 35 preferably has an omnidirectional radiation characteristic.

The signals radiated or retransmitted by the ground station 31 are received at the above (and other similarly equipped) craft by a receiving antenna 37 and are coupled to a receiver 39. In the receiver 39 the signals are demodulated and amplified. The receiver output wave train 41 comprises a group of randomly timed pulse signals representative of random modulation impressed on the carrier transmission of the instant and other craft. The wave train 41 is then applied to a coincidence circuit 43. The coincidence circuit 43 may comprise a multi-grid gating tube circuit wherein pulses occurring simultaneously on different tube electrodes result in output pulses therefrom.

As mentioned previously, coincident with the keying of the airborne transmitter the train of multivibrator signals 21 are coupled to a second circuit, in this instance a variable time delay line 45. The delay line may comprise, for example, a lumped constant time delay line. The pulses 21 are delayed in the delay line 45 and then are applied to the coincidence circuit 43. The time delay of the delay line is adjusted so that coincidences are obtained between the delayed multivibrator pulses 21 and pulses corresponding thereto in wave train 41 transmitted by the ground installation. The amount of time delay required to produce such coincidences is directly proportional to the distance from the craft to the ground station 31. Since the pulses comprising the wave train 21 are random in time there is just one setting of the delay line 45 which will cause all the locally generated pulses 21 to coincide with corresponding pulses in wave train 41. The coincidence circuit 43 produces output pulses which are integrated by a capacitor 46 or other suitable integration device. An indicator 47 such as a D. C. voltmeter connected thereto provides an indication of proper adjustment of the delay line to provide coincidence. Under no circumstances will the retransmitted signals of other craft have more than an occasional isolated coincidence with locally generated pulses. Thus a large number of craft may operate on the same communication channel with an almost complete absence of system crosstalk.

What is claimed is:

1. A radio ranging system for determining the distance between a mobile craft and a reference point comprising, at said craft, means for producing randomly timed signals, variable time delay means for delaying said randomly timed signals, means for utilizing undelayed portions of said random signals for radiating correspondingly timed pulses of radio-frequency energy throughout an area including said reference point, receiver means responsive to retransmission of said randomly timed signals from said reference point for receiving said signals, and means for comparing the relative occurrence of said received retransmitted signals and said delayed randomly timed signals to provide a measure of said distance.

2. A radio ranging system for determining the distance between a mobile craft and a reference point comprising, at said craft, means for producing randomly timed signals, variable time delay means for delaying said randomly timed signals, means for utilizing undelayed random signals for omnidirectionally radiating correspondingly timed pulses of radio-frequency energy throughout an area including said reference point, receiver means responsive to retransmission of said randomly timed from said reference point for receiving said signals, and a pulse coincidence circuit for producing output signals in response to coincidences between said retransmitted signals and said delayed randomly timed signals, the amount of time delay required to produce substantially complete coincidence therebetween being a measure of said distance.

3. A radio ranging system for determining the distance between a mobile craft and a reference point comprising, at said craft, means for generating randomly timed signals, means for thresholding said random signals to pass only signals having amplitudes exceeding a predetermined value, variable time delay means for delaying said thresholded signals, means for utilizing undelayed thresholded signals for radiating correspondingly timed pulses of radio-frequency energy throughout an area including said reference point, receiver means responsive to retransmission of said randomly timed signals from said reference point for receiving said signals, and means for comparing the relative occurrence of said received retransmitted signals and said delayed thresholded signals to provide a measure of said distance.

4. A radio ranging system as claimed in claim 3 wherein said signal comparison means comprises a pulse coincidence circuit which includes means for integrating signals resulting from coincidences between said delayed thresholded signals and said retransmitted signals.

5. A radio ranging system for determining the distance between a mobile craft and a reference point comprising; at said craft, means for producing randomly timed signals, variable time delay means for delaying said randomly timed signals, means for utilizing undelayed randomly timed signals for radiating correspondingly timed pulses of radio-frequency energy at a first carrier signal frequency throughout an area including said reference point; at said reference point, means for receiving said random signals and retransmitting said signals at a second carrier signal frequency throughout a service area within which said craft is located; at said craft, receiver means for receiving said retransmitted signals, and means for comparing the relative occurrence of said received retransmitted signals and said delayed randomly timed signals to provide a measure of said distance.

References Cited in the file of this patent

UNITED STATES PATENTS

| | | |
|---|---|---|
| 2,426,216 | Hight | Aug. 26, 1947 |
| 2,433,341 | Busignies | Dec. 30, 1947 |
| 2,459,811 | Grieg | Jan. 25, 1949 |
| 2,607,913 | Williams | Aug. 19, 1952 |
| 2,671,896 | De Rosa | Mar. 9, 1954 |